Figure 1:
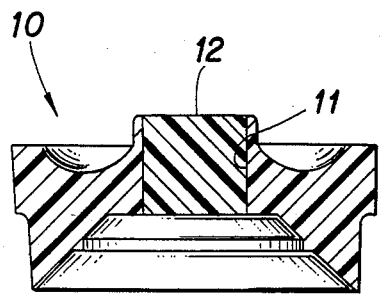

United States Patent [19]

Connelly

[11] Patent Number: 4,567,118

[45] Date of Patent: Jan. 28, 1986

[54] CELL VENT

[75] Inventor: Robert L. Connelly, Pearl River, N.Y.

[73] Assignee: Duracell Inc., Bethel, Conn.

[21] Appl. No.: 671,056

[22] Filed: Nov. 13, 1984

Related U.S. Application Data

[63] Continuation of Ser. No. 512,806, Jul. 11, 1983, abandoned.

[51] Int. Cl.[4] .............................................. H01M 2/12
[52] U.S. Cl. ........................................ 429/53; 429/82; 429/181; 429/185
[58] Field of Search ................. 429/53, 181, 184, 185, 429/82, 54

[56] References Cited

U.S. PATENT DOCUMENTS

| | | | |
|---|---|---|---|
| 3,320,097 | 5/1967 | Sugalski | 429/82 X |
| 3,338,750 | 8/1967 | Urry | 429/53 |
| 3,877,992 | 4/1975 | Urry | 429/82 |
| 4,008,354 | 2/1977 | Fitchman et al. | 429/56 |
| 4,010,406 | 3/1977 | West et al. | 429/53 X |
| 4,112,200 | 9/1978 | Heinz, Jr. | 429/54 |
| 4,255,499 | 3/1981 | Beatty | 429/54 |

Primary Examiner—Charles F. LeFevour
Attorney, Agent, or Firm—Ronald S. Cornell; Israel Nissenbaum

[57] ABSTRACT

An electrochemical cell particularly of small dimensions having a vent which comprises a hot melt adhesive or other extrudible leak resistant material sealed to and substantially surrounding that portion of a metal electrode conductor extending through an aperture in a cell sealing element.

13 Claims, 2 Drawing Figures

CELL VENT

This application is a continuation of application Ser. No. 512,806, filed July 11, 1983 now abandoned.

This invention relates to vents for electrochemical cells and particularly to alkaline type cells of small dimensions having nail type electrode conductors.

Gas evolution generally under cell abuse conditions with concomitant cell leakage, bulging and the like has been a constant problem in sealed electrochemical cells particularly in aqueous electrolyte cells such as alkaline cells wherein hydrogen gas evolution is a particular problem. Various expedients have been utilized in negating the untoward effects of such gas evolution such as by inclusion of sundry gas inhibitors, gas getters and most commonly, vents.

Cell vents fall into several categories of operation which include the rupturing of a sealing membrane, the opening of a gas escape path by pressure movement of a portion of the cell seal, the expulsion of a sealing plug or the melting thereof by the heat which accompanies a pressure rise, e.g. U.S. Pat. No. 3,877,992 and as described in U.S. Pat. No. 4,008,354 the pressure extrusion of a hot melt adhesive material from an aperture in a cell top.

In larger cells the utilization of vents has been relatively easily effected because of sufficient room for the deployment thereof. However, in smaller size cells, e.g. 0.45 inch (1.1 cm) diameter or less such venting expedients have not been generally utilized because of overriding considerations of effectiveness of the vent as a seal, loss of capacity because of the volume of the venting structure and generally the questionable nature of an effective vent in the smaller dimensions.

It is an object of the present invention to provide a vent for an electrochemical cell particularly of small dimensions which vent is of minimal dimensions, does not significantly affect cell sealing and which provides for effective protective venting.

Figure 2:
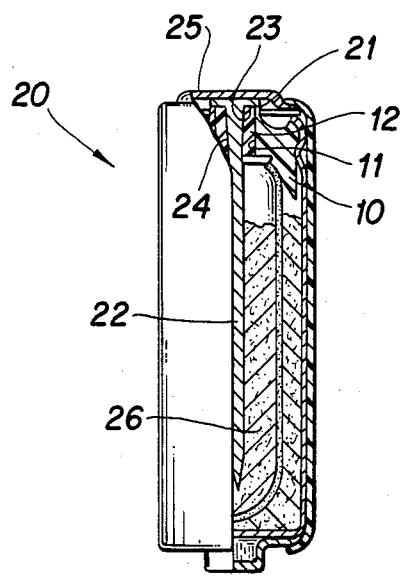

This and other objects, features and advantage of the present invention will become more evident from the following discussion as well as the drawings in which:

FIG. 1 is a cross section view of a cell top or sealing element of the present invention prior to placement within the cell; and FIG. 2 is a partial cross section view of a cell having the cell sealing element in FIG. 1 with the vent of the present invention formed therein.

Generally the present invention comprises an electrochemical cell with an integral vent which is effective and of generally minimal dimensions. The cell is comprised of an open ended container with a sealing member closing such open end. The vent is comprised of an extrudible material such as a hot melt adhesive positioned within an aperture generally centrally located of the sealing member of said cell and sealed to the walls of said aperture. A metal member particularly an electrode conductor such as a nail, extends through the same aperture and through the extrudible material and is sealingly engaged or frictionally fit to such material and is substantially surrounded thereby.

In the past, sealing member apertures have had central apertures specifically sized to accommodate the metal conductor with an interference fit in order to minimize possible leakage. To further ensure leakage prevention it has also been the practice to fill in substantially all of the imperfections on the surface of metal conductors, within the aperture, and the walls of the aperture themselves by means of a very thin layer of a filler material such as of asphalt positioned between the surface of the metal conductor and aperture wall. The nail is either initially coated with such filler material or a small amount thereof is placed in the aperture and is smeared by the nail. The amount of filler used was thus limited to a very thin layer by the dimensional interference fit and because of the minimal dimension it could not function as a venting mechanism.

In accordance with the present invention either the metal conductor is downsized or more preferably the central aperture is widened whereby the metal conductor no longer is in interference fit with the aperture walls with the area therebetween being filled with an extrudible sealant material whereby the metal conductor is substantially surrounded by such sealant. The sealant material is present in sufficient amount and exposed surface area to the cell interior and with a sufficiently large cross section throughout, relative to pressure evolution and containment characteristics of the particular cell, whereby it can function as a vent for the cell under untoward or abusive conditions resulting in pressure and often temperature elevation conditions. Under conditions of excessive pressure the material is extruded from around the metal conductor whereby a venting pathway is opened up for release of evolved gas. In smaller cell sizes, in particular, such venting mechanism is more effective under various abusive conditions, than other extrusion vents. In the smaller cells there is a limited area available for providing a vent of sufficient size to enable pressure alone to effect venting. However, in the vent of the present invention the heat conducted by the metal electrode conductor facilitates the pressure extrusion venting, i.e. lowering the requisite pressure, by melting or softening the sealant under excessive temperature conditions (which generally accompany pressure rise).

In producing the venting mechanism of the present invention it is preferred that the central aperture of the cell top be initially sealingly filled with the sealant material and thereafter the metal electrode conductor such as a nail is pushed through the sealant material into a leak resistant frictional fit therewith. In such embodiment it is important that the sealant material be securely affixed to the walls of the aperture to prevent dislodging thereof during the electrode conductor penetration. A fluidized hot melt adhesive material placed on a sufficiently heated substrate, i.e. the heated cell top provides the requisite secure affixation. Otherwise, since there is no interference fit between the metal conductor and the aperture walls, such dislodgement may result in a substantial leakage path. In order to facilitate metal conductor penetration without dislodgement of the sealant material it is further preferred that the nail be heated during such operation. Such conductor heating is of additional value in an emobodiment wherein the cell top and the metal conductor, positioned in the aperture thereof, are held in spaced relation and the sealant is then placed therebetween. Under such conditions the metal conductor should be heated since it would tend, if cold, to withdraw heat from the sealant with resultant poor bonding and sealing.

For reproducibility, facilitated manufacturing, and enhanced utilization of the heat conduction for vent operation it is preferred that the sealant material be in the form of a concentric ring or annulus completely around the metal electrode conductor particularly if such conductor is a nail.

The vent structure of the present invention is of particular applicability in cylindrical cells having diameters of less than 0.45" (1.1 cm) since it can be readily integrated with existing components of the cells and is of compact dimensions. Cells of such dimensions, which could not accommodate reliable vents because of size constraints, can be safely and economically vented whenever necessary since the vent of the present invention is a pressure vent which if necessary is temperature assisted as described above.

Cell vents are designed to relieve a pressure condition which tends to either cause electrolyte leakage or seal decrimping. As a result, effective venting parameters of the sealant material, e.g. amount of interiorly exposed surface area, the cross section throughout the aperture, exposed surface area, material shear strength and softening points all in conjunction with the specific metal conductor are, in accordance with the present invention, dependent upon the particular cell; with different cells having various venting requirements. Factors to be considered in varying such parameters include the internal cell void space, pressure required for decrimping and the amount of expected gas evolution which could be expected should the cell be abused. Increase of softening points, shear strengths, and the amount of material adhered to the aperture walls tends to delay venting whereas increase of exposed surface area and area bonded to the heat conducting metal electrode conductor tends to accelerate venting.

The cell tops utilized in the cells of the present invention span and sealingly close the open end of a cylindrical cell container. They are generally made from a rigid, insulative, plastic material such as of nylon, polysulfonate, polyethylene, and the like. The metallic electrode conductor is most commonly a nail which generally is inserted into the anode and is usually comprised of steel which has been nickel plated. The cross sectional area of such nail within the aperture in small diameter cells should be no more than half of the cross sectional area of the aperture whereby sufficient sealant may be emplaced within the aperture for effective venting. Since areal constriction in the aperture may impede the extrusion process, it is preferred, particularly in smaller diameter cells to have the metal conductor occupy as little space as possible in the aperture with a cross sectional areal ratio of at least 3:1 of sealant to conductor being preferred.

Generally effective venting pressures are determined by absolute surface area of the sealant material exposed to the internal cell pressure, thickness of the sealant material in the aperture, the configuration of the aperture walls, e.g. angular deviations of the wall from the perpendicular, specific sealant material characteristics, heat conductivity of the metal electrode conductor, and its physical and dimensional relationship with the sealant material. In the latter regard it is noted that for manufacturing reliability, wherein a nail anode conductor is utilized, the head thereof is of a diameter greater than that of the aperture in order that the upper periphery of the aperture in the sealing member act as a stop for nail insertion into the aperture. Accidental short circuiting by excessive nail movement during cell construction is prevented thereby. However, the dimensioning of the nailhead and the adjacent positioning thereof relative to the venting sealant material of the present invention results in the closing off of sealant extrusion during venting. It is accordingly required in such embodiment that the nail be capable of moving during the venting process to open an extrusion escape path between the head thereof and the aperture periphery in order to permit venting to progress. Alternatively, means such as a perforated or substantially open spacer may be placed between the nailhead and the periphery of the aperture to act as a stop for the nailhead while still permitting venting. In fact the cell top itself may be initially molded to provide spacing protrusions to permit such venting.

The sealant material should be inert to the cell components and should be extrudible under the desired venting pressure whether with or without excessive heat buildup. It is however preferred that the sealant material also have a heat softening temperature whereby heat generated within the cell may be conducted to the sealant material by means of the metal electrode conductor in order to facilitate venting, particularly in the restricted areal vents of the smaller diameter cells. The sealant material should preferably be capable of forming a substantially leak proof seal between the metal conductor and the sealing member particularly since, in accordance with the present invention, there is no interference fit therebetween. A preferred material for use as the venting sealant of the present invention is a type of material known as hot melt adhesive; more specifically, those which are particularly preferred are comprised of low molecular weight polyamides. Such materials are generally resistant to degradation in the presence of common cell materials and they form good seals. Additionally, such materials remain soft after solidification whereby they may be easily penetrated by the metal conductor, and they generally have shear strengths and softening temperatures in the range required for the venting of cells. For example, Norcast 570M (trademark of R. H. Carlson Co. for its hot melt adhesive) has extrusion pressure related to temperature as follows (with 0.008 cm$^2$ exposed area):

| Pressure (KG/cm$^2$) | Temperature (C.°) |
|---|---|
| 22.5–24.6 | 71 |
| 38.7–57.6 | 45 |
| 57.6–67.5 | 35 |
| above 76 | 25 |

With specific reference to the drawings, FIG. 1 depicts a common plastic cell top or sealing member 10. The central aperture 11 is shown as having been filled with a hot melt adhesive material 12. During the construction of the cell 20 shown in FIG. 2, metal nail member 22 is driven through the hot melt adhesive material 12 and into electrical contact with anode material 26. The head 23 of the nail member 22 is shown as resting on the peripheral edge 21 of aperture 11 of sealing member 10 with said head being connected to metal cell cap 25 for external electrical connection. The portion of the nail member 22 passing through aperture 11 is sealing engaged to and surrounded by an annulus of the sealant material 12 in a leak resistant friction fit engagement. Such frictional fit is enhanced by the increased diameter of 24 of the nail within the aperture 11. During venting, the hot melt adhesive material 12 is sufficiently softened either by extrusion pressure or temperature whereby nail head 23 is slightly lifted from contact with peripheral aperture edge 21 by upward movement of the nail member 22. An escape path for the extruded material and evolved gas is opened thereby with such evolved gas being thereafter vented to the atmosphere around metal cell cap 25.

In order to more fully illustrate the construction and efficacy of the present invention the following examples are presented. It should however be noted that the details contained therein are not to be construed as limitations on the present invention.

EXAMPLE 1

Ten cylindrical cells are constructed having the configuration shown in the drawings with each having the dimensions of 4.4 cm height, 0.4 cm diameter. The cells are typical alkaline cells with each having a zinc anode, $MnO_2$ cathode and KOH electrolyte. The cell container is sealed with a nylon top having a central aperture of 0.3 cm length and a constant diameter of 0.3 cm. The aperture is filled with two drops of Norcast 570M hot melt adhesive applied while the nylon is heated to a temperature above 150° C. An 8% nickel silver wire nail concentrically perforates the heat melt adhesive and serves as the anode conductor. The nail has the dimensions of 3.6 cm overall length, 0.5 cm shank diameter, and 0.33 cm nailhead diameter. The cells are reverse charged at 1.5 amp constant current and all vent in a time range between 30 and 105 seconds.

EXAMPLE 2

Six cells are made as in Example 1 with one of the cells being partially discharged and placed in series with the remaining five fresh cells and the series stack being discharged through 83 ohms. Cell reversal results in venting of the cell which had been partially discharged, thereby demonstrating that the vent will function from pressure alone without significant heat build-up in the cell.

The above examples are presented for illustrative purposes and limitations and details contained therein are not to be construed as limitations on the present invention. The vent of the present invention is generally useful in any cell requiring pressure venting including other alkaline cell systems such as mercury and silver oxide cells as well as non-aqueous cells such as Li/$MnO_2$ particularly in the smaller sizes. Variations in structural configuration and materials utilized in making the venting mechanism as well as the electrochemical cell components are possible without departing from the scope of the present invention as defined in the following claims.

What is claimed is:

1. An electrochemical cell comprised of a cell container having an open end thereof closed by a sealing member having an aperture therein with a metal member extending therethrough, characterized in that an extrudible material substantially surrounds the portion of said metal member within said aperture and is sealingly engaged thereto, with said extrudible material adheringly securely sealingly engaging the wall defining said aperture; wherein said metal member is heat conductive whereby heat generated within the cell is conducted, by said metal member, to said extrudible material for softening thereof; and wherein a portion of said extrudible material is interiorily exposed to pressure within said cell, and a cross sectional area of said softened extrudible material is sufficiently large to permit said extrudible material to extrude to relieve excessive internal pressure.

2. The cell of claim 1 wherein said metal member comprises a nail which functions as an electrode conductor.

3. The cell of claim 2 wherein said extrudible material is a hot melt adhesive.

4. The cell of claim 3 wherein said nail is sealed to said hot melt adhesive by having been placed therethrough while said nail is heated.

5. The cell of claim 2 wherein the cross sectional area of said portion of said nail is no greater than said cross sectional area of said extrudible material.

6. The cell of claim 5 wherein the cross section of said portion of said nail is no larger than one third the cross sectional area of said extrudible material.

7. The cell of claim 3 wherein said hot melt adhesive forms an annulus around said nail within said aperture.

8. The cell of claim 7 wherein the diameter of said cell container is less than 1.1 cm.

9. The cell of claim 7 wherein said nail has a head thereof resting on a portion of said sealing member external to the cell on the peripheral edge of said aperture and wherein said cell contains means for permitting venting movement of said hot melt adhesive between said peripheral edge and said nail head.

10. The cell of claim 9 wherein said means for permitting venting comprises means for permitting movement of said nail head away from said peripheral edge, during venting, thereby opening a path for extrusion of said hot melt adhesive and venting of said cell.

11. The cell of claim 7 wherein said nail has a head thereof resting on a porous spacer seated on the outer peripheral edge of said aperture.

12. An electrochemical cell having a zinc anode, a manganese dioxide cathode, and an alkaline electrolyte contained within a cell container having an open end thereof closed by a sealing member having a central aperture therein with a metal nail anode collector extending through said aperture, characterized in that the portion of said nail anode collector within said aperture is surrounded by and is sealingly engaged to an annulus of a hot melt adhesive material, said hot melt adhesive material being adheringly securely sealingly engaged to the wall defining said aperture; wherein said metal nail is heat conductive whereby heat generated within the cell is conducted, by said metal member, to said hot melt adhesive material material for softening thereof; and wherein a portion of said softened hot melt adhesive material is interiorily exposed to pressure within said cell, and a cross sectional area of said hot melt adhesive material, within said aperture, is sufficiently large to permit said hot melt adhesive material to extrude to relieve excessive internal pressure.

13. The cell of claim 12 wherein the diameter of said cell container is less than 1.1 cm.

* * * * *